United States Patent
Rueger et al.

(10) Patent No.: US 11,307,319 B2
(45) Date of Patent: Apr. 19, 2022

(54) AUTOMATED FAULT UNCERTAINTY ANALYSIS IN HYDROCARBON EXPLORATION

(71) Applicant: Landmark Graphics Corporation, Houston, TX (US)

(72) Inventors: Andreas Rueger, Glenwood Springs, CO (US); Steven Roy Angelovich, Highlands Ranch, CO (US)

(73) Assignee: Landmark Graphics Corporation, Houston, TX (US)

( * ) Notice: Subject to any disclaimer, the term of this patent is extended or adjusted under 35 U.S.C. 154(b) by 7 days.

(21) Appl. No.: 16/929,911

(22) Filed: Jul. 15, 2020

(65) Prior Publication Data
US 2022/0018982 A1    Jan. 20, 2022

(51) Int. Cl.
*G01V 1/30* (2006.01)
*G01V 1/28* (2006.01)
(Continued)

(52) U.S. Cl.
CPC .............. *G01V 1/301* (2013.01); *G01V 1/282* (2013.01); *G01V 1/345* (2013.01); *G06K 9/6256* (2013.01); *G06N 3/02* (2013.01); *G01V 2210/642* (2013.01); *G01V 2210/667* (2013.01); *G01V 2210/74* (2013.01)

(58) Field of Classification Search
CPC ........ G01V 1/301; G01V 1/282; G01V 1/345; G01V 2210/642; G01V 2210/667; G01V 2210/74; G06K 9/6256; G06N 3/02
See application file for complete search history.

(56) References Cited

U.S. PATENT DOCUMENTS

| | | | |
|---|---|---|---|
| 9,121,968 B2 | 9/2015 | Posamentier et al. | |
| 2010/0332139 A1* | 12/2010 | Bruun | G01V 1/305 702/18 |

(Continued)

FOREIGN PATENT DOCUMENTS

WO    2019055562    3/2019

OTHER PUBLICATIONS

Alcalde et al., "Impact of Seismic Image Quality on Fault Interpretation Uncertainty", Feb. 2017, 7 pages.
(Continued)

*Primary Examiner* — Raymond L Nimox
(74) *Attorney, Agent, or Firm* — Kilpatrick Townsend & Stockton LLP

(57) ABSTRACT

A system includes a processor and a memory. The memory includes instructions that are executable by the processor to access a plurality of seismic images of a subterranean formation in a first geological area. The instructions are also executable to generate a plurality of fault estimates from each of the plurality of seismic images. Further, the instructions are executable to generate a processed seismic image of the first geological area by normalizing and merging the plurality of seismic images and the plurality of fault estimates. Additionally, the instructions are executable to generate a statistical fault uncertainty volume of the first geological area using the processed seismic image. Furthermore, the instructions are executable to control a drilling operation in the first geological area using the statistical fault uncertainty volume of the first geological area.

18 Claims, 6 Drawing Sheets

(51) Int. Cl.
  *G01V 1/34* (2006.01)
  *G06N 3/02* (2006.01)
  *G06K 9/62* (2006.01)

(56) References Cited

U.S. PATENT DOCUMENTS

| | | | |
|---|---|---|---|
| 2011/0218737 A1* | 9/2011 | Gulati | G06T 15/00 |
| | | | 702/16 |
| 2011/0295510 A1* | 12/2011 | Gulati | G01V 1/288 |
| | | | 702/16 |
| 2015/0117151 A1 | 4/2015 | Curry et al. | |
| 2019/0011583 A1* | 1/2019 | Ray | G01V 1/303 |
| 2019/0113638 A1 | 4/2019 | Wahrmund et al. | |
| 2020/0033501 A1* | 1/2020 | Nyrnes | E21B 47/0228 |
| 2020/0064507 A1 | 2/2020 | Mao et al. | |
| 2020/0183032 A1* | 6/2020 | Liu | G01V 1/301 |
| 2020/0184374 A1 | 6/2020 | Liu et al. | |
| 2020/0200931 A1 | 6/2020 | Mao et al. | |

OTHER PUBLICATIONS

Georgsen et al., "An Uncertainty Model for Fault Shape and Location", 2014, pp. 957-969.

Halliburton, "Decision Space 365", 2020, 3 pages.
Halliburton, "Decision Space Geosciences 10", 2015, 8 pages.
Halliburton, "SeisSpace ProMAX Software Family", 2013, 4 pages.
Schaaf et al., "Quantification of Uncertainty in 3-D Seismic Interpretation: Implications for Deterministic and Stochastic Geomodeling and Machine Learning", 2019, pp. 1049-1061.
Schlumberger , "Petrel Geology and Modeling", 2015, 2 pages.
PCT Application No. PCT/US2020/042134 , International Search Report and Written Opinion, dated Mar. 30, 2021, 11 pages.
Eichkitz et al., "On The Impact of Alternative Seismic Time Imaging Methods On Subsurface Fault Mapping In The Northernmost Molasse Basin Switzerland", Interpretation, vol. 8, No. 4, Jun. 2020, pp. 1-13.
GB2108328.2 , "Combined Search and Examination Report", dated Feb. 14, 2022, 11 pages.
Harris et al., "Subseismic Fault Identification Using the Fault Likelihood Attribute: Application to Geosteering in the DJ Basin", Proceedings of The 7th Unconventional Resources Technology Conference, Jul. 22, 2019.
Wu et al., "FaultNet3D: Predicting Fault Probabilities, Strikes, and Dips With a Single Convolutional Neural Network", IEEE Transactions on Geoscience And Remote Sensing, vol. 57, No. 11, Nov. 2019, pp. 9138-9155.

* cited by examiner

AUTOMATED FAULT UNCERTAINTY ANALYSIS IN HYDROCARBON EXPLORATION

TECHNICAL FIELD

The present disclosure relates generally to hydrocarbon exploration. More specifically, but not by way of limitation, this disclosure relates to facilitating hydrocarbon exploration by performing an automated fault uncertainty analysis on seismic data.

BACKGROUND

Hydrocarbon exploration is the search for hydrocarbons, such as oil or gas, within a subterranean formation. Interpretation of faults in seismic data has a significant impact on hydrocarbon exploration, reservoir characterization, and field development workflows. The faults may represent drilling hazards, an indication of fluid migration of reservoirs, and an indication of compartmentalization of reservoirs. Thus, a comprehensive understanding of faulting in a reservoir may provide significant value for efficient development of hydrocarbon resources.

Fault interpretation may be performed manually by interpreting seismic data of an area. Manual interpretation is both time and labor intensive. Further, manual fault interpretations may differ significantly due to human bias or pre-processing and data visualization technologies. Seismic images used by interpreters may include imperfections resulting from noise, velocity modeling, and imaging errors. Thus, manual interpretation of a subterranean fault is subject to uncertainties, both in terms of whether a fault is present at a particular location and with respect to a precise location, fault-network connectivity, and orientation of the fault.

DETAILED DESCRIPTION

Figure 1:
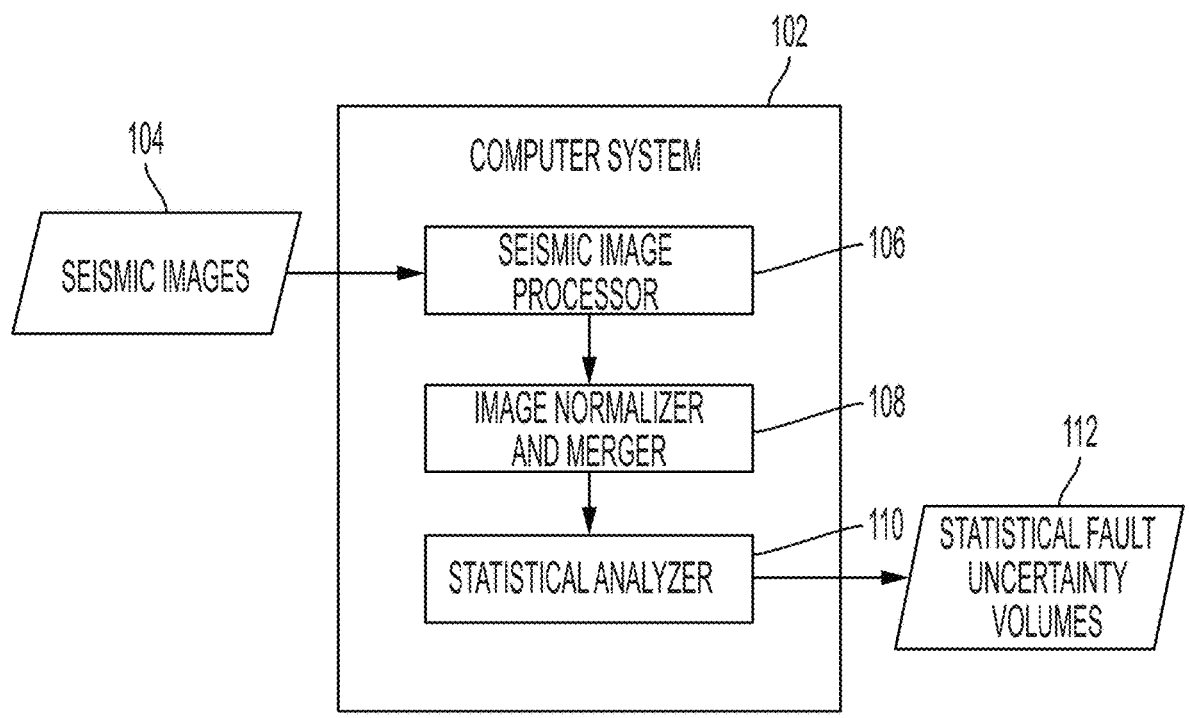
FIG. 1 depicts a computing environment including a computing system performing processing operations on seismic images according to some aspects of the present disclosure.

Certain aspects and features of the present disclosure relate to facilitating hydrocarbon exploration by performing an automated fault uncertainty analysis on seismic data. Fault plane geometries and fault networks may represent drilling hazards. Further, the fault plane geometries may determine reservoir connectivity, gross volume, and performance. Interpreting faults rapidly, accurately, and with knowledge of intrinsic uncertainty may provide a significant advantage in facilitating hydrocarbon exploration and estimating commercial viability of a geological region.

Multiple fault attribute volumes may be computed on a plurality of input seismic image volumes to produce a statistically valuable population of fault attribute realization. Once the multiple fault attribute volumes are computed, the redundancy of the fault attribute volumes may be leveraged to derive qualitative and quantitative uncertainty and confidence measures of predicted fault attributes. These uncertainty and confidence measures of the predicted fault attributes may be used as a guide and risk-assessment data for manual and automated fault interpretations. In this manner, the fault uncertainty may be provided in a proactive manner, such as prior to drilling, rather than a reactive manner, such as typically performed after encountering unexpected hazards such as drilling into a fault.

By combining the computed quantitative statistical data with routinely and efficiently computed seismic attributes, a non-linear interpretation-confidence-index prediction model may be built. The prediction model may be used in regions with similar geological settings that have not been interpreted for fault uncertainty due to the unavailability of the necessary data or for economic reasons. The fault uncertainty predictions provided by the prediction model may be more computationally efficient than the computation of fault attribute volumes used to build the prediction model.

These techniques may provide a fully automated method for deriving fault uncertainty based on seismic fault attributes. In this manner, novel visualizations of qualitative fault uncertainties can be created. The novel visualizations of qualitative fault uncertainties may provide an interpreter with valuable insights into the dominant fault corridors. In addition, the novel visualizations of qualitative fault uncertainties highlight areas of a formation that may benefit from further analysis. Additionally, valuable statistical information on fault existence and placement may be computed without explicit and time-consuming manual or automatic fault plane construction. Further, statistical measures of fault confidence may be leveraged to introduce uncertainty-weights in automatic fault extraction algorithms. In some examples, the influence of data quality, fault placement, image algorithm assumptions, and velocity-mode-induced image distortions on a fault interpretation may be anticipated.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is an example of a computing environment including a computing system 102 performing processing operations on seismic images 104. The computing system 102, may include multiple processing modules, such as a seismic image processor 106, an image normalizer and merger 108, and a statistical analyzer 110. An output of the computing system 102 may include statistical fault uncertainty volumes 112 that represent fault uncertainties generated from the seismic images 104.

In an example, the seismic images 104 may be generated from a series of seismic surveys taken for an area of a subterranean formation. The area may include a geological area being inspected for future hydrocarbon exploration. The seismic surveys may include transmission of seismic waves into a geological formation. The seismic waves may reflect back from the geological formation to one or more seismic wave receivers. Using the reflected seismic waves, a seismic image generator may generate the seismic images 104 that represent geological characteristics of the area being surveyed.

In the computing system 102, the seismic images 104 may be accessed and provided to the seismic image processor 106. Each of the seismic images 104 may represent different seismic surveys of the same geological area. For example, the seismic images 104 may include, but are not limited to, identical-domain subsurface images obtained by a range of seismic-wave migration algorithms using different migration velocity fields, images obtained from distinct frequency bandwidths of the seismic waves, and images obtained from partial stacks of seismic data.

To achieve a statistically significant number of the seismic images 104, three or more different seismic images 104 may be accessed by the computing system 102 for further processing. More or fewer seismic images 104 may also be used to generate uncertainty results of varying qualities. In an example, the seismic images 104 may each be generated from a plurality of different sub-angle ranges used for receiving the seismic wave reflections. Other differences may also be used to generate the seismic images 104, such as using isotropic or anisotropic migration velocity fields, using distinct frequency bandwidths of the seismic wave, using partial stacks of the seismic data, etc.

The seismic image processor 106 may repeatedly process each of the seismic images 104 accessed by the computing system 102. The processing may estimate fault likelihood at different locations depicted in the seismic images 104 using distinct hyper-parameter settings. Each algorithmic hyper-parameter setting can simulate various fault interpretation styles and goals by constraining, for example, fault stiffness and reflector truncation sharpness. In an example, each of the seismic images 104 may be processed multiple times with a focus on the different hyper-parameters to generate an indication of fault likelihoods in each of the seismic images 104.

The processed seismic images 104 may enter a quantitative analysis phase at the image normalizer and merger 108. The image normalizer and merger 108 may normalize and co-render all of the fault likelihood estimates generated for the seismic images 104 by the seismic image processor 106. Normalizing the fault likelihoods may be accomplished by generating a fault likelihood for each of the processed seismic images 104 at a normalized value between zero and one. Co-rendering the fault likelihood estimates may involve overlaying data sets of the processed seismic images 104 to generate a combined representation of the fault likelihood estimates of the set of processed seismic images 104.

By normalizing and co-rendering the fault likelihood estimates, fault-plane uncertainty corridors and fault-plane connectivity volumes may be generated. In an example, the fault-plane uncertainty corridors and the fault-plane connectivity volumes may be provided as overlays of the fault interpretations of the seismic images 104. The fault-plane connectivity volumes and uncertainty corridors are qualitative in nature and may enable accelerated and uncertainty-aware fault interpretation. Further, the fault-plane connectivity volumes and uncertainty corridors may be useful in classifying subsurface regions that are suitable for automated interpretation and those that are more suitable for human intervention. For example, an indication of limited uncertainty of a fault prediction in a particular area may be suitable for reliance on automated interpretation, while an indication of a greater uncertainty of a fault prediction may be more suitable for further review by a skilled analyst.

In an example, the fault-plane uncertainty corridors may provide an indication of uncertainty of a fault being located within a specific region. Further, the fault-plane connectivity volumes may provide an indication of interconnectivity of the identified fault systems. An output of the image normalizer and merger 108 may include a three-dimensional representation of a geological area being analyzed that demonstrates an uncertainty measurement of the presence and location of faults within the geological area.

The output of the image normalizer and merger 108 may be accessed by the statistical analyzer 110 in a quantitative fault analysis phase of the seismic images 104. If data quality is sufficient, the normalized and merged fault likelihood volumes that are output by the image normalizer and merger 108 may be analyzed statistically, such as by determining a mean, max, and standard deviation of a fault likelihood at a particular pixel location. Further, a quantitative measure of local image similarity and local fault interpretation variance in spatial location or a dip of the fault may be computed. The statistical data may provide valuable input to reservoir model building or as a weight to machine-learning based automated fault interpretation analysis.

In an example, the statistical data may include specific uncertainty information about the fault likelihoods generated by the normalizer and merger 108. For example, the fault likelihood information may include an indication of uncertainty that a particular pixel associated with a location in a subterranean formation is along a fault or an indication of uncertainty that a particular fault plane is offset. The resulting statistical fault uncertainty volumes 112 may be output by the statistical analyzer 110 of the computing system 102.

Figure 2:
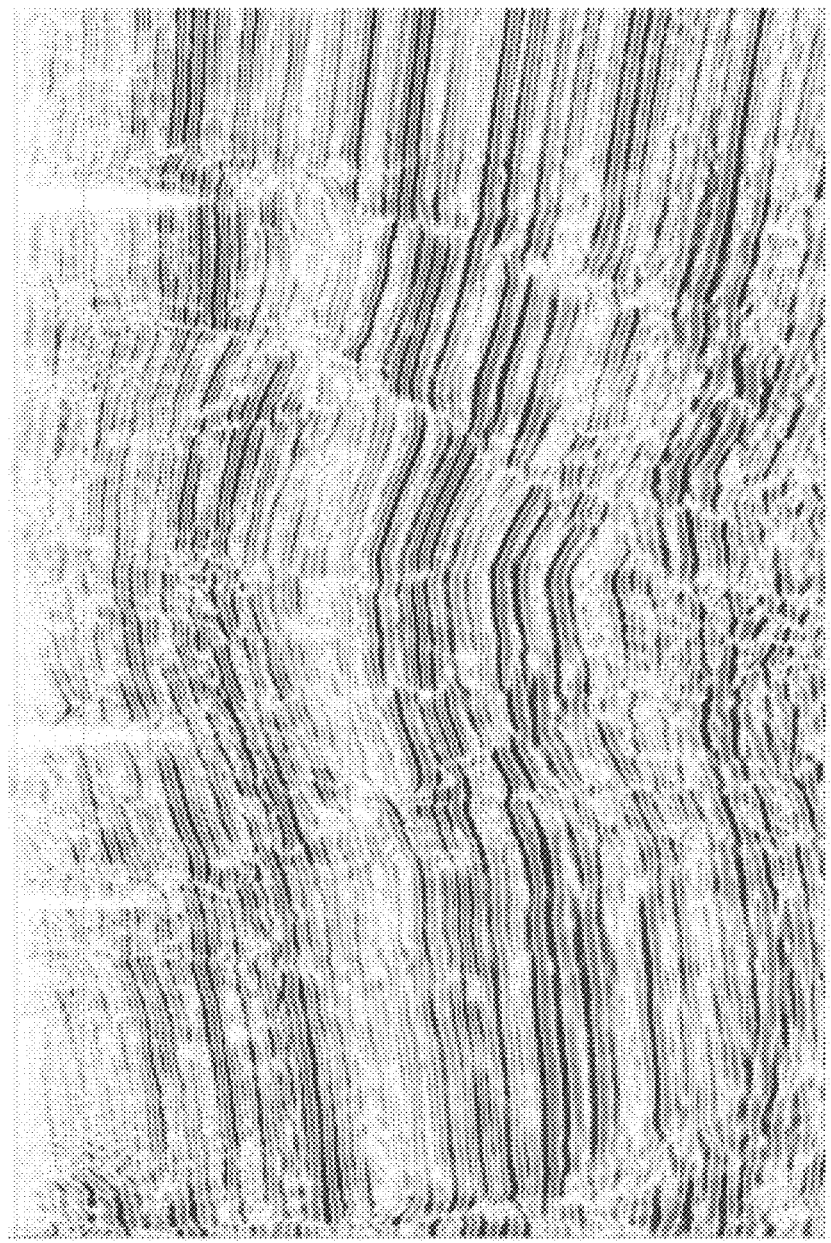
FIG. 2 depicts an example of a seismic image according to some aspects of the present disclosure.

FIG. 2 is an example of the seismic image 104 according to some aspects of the present disclosure. The seismic image 104 may be used to estimate properties of a formation at a particular location. For example, the seismic image 104 may be used to estimate faults within a geological formation based on, for example, formation layer inconsistencies within the seismic image 104.

The illustrated seismic image 104 may be one of several seismic images 104 received by the computing system 102. Each of the seismic images 104 received by the computing system 102 may represent the same geological area, and each of the seismic images 104 may be slightly varied due to using variations in sub-angle ranges, using migration velocity fields, using distinct frequency bandwidths of the seismic wave, using partial stacks of the seismic data, etc.

Further, several additional cross-sections of the seismic images 104 may be used to provide a three-dimensional representation of the estimated properties of the formation. For example, the faults may be estimated as three-dimensional features instead of a two-dimensional feature of an individual seismic image 104.

Figure 3:
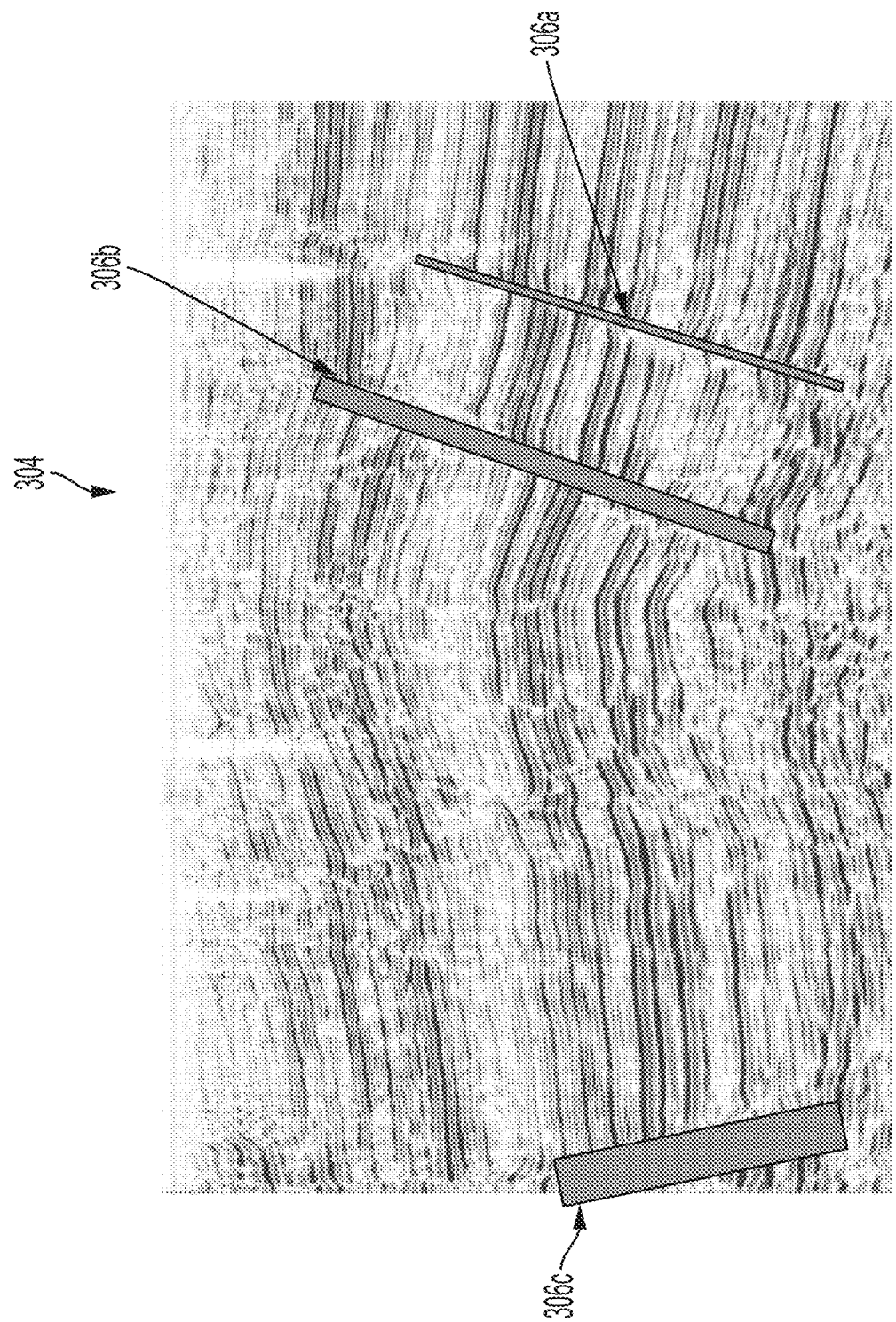
FIG. 3 depicts an example of a seismic image with a fault uncertainty analysis overlay according to some aspects of the present disclosure.

FIG. 3 is an example of a processed seismic image 304 with a fault uncertainty analysis overlay according to some aspects of the present disclosure. The fault uncertainty analysis overlay may include fault-plane corridor predictions 306a, 306b, and 306c. In an example, the fault-plane corridor predictions 306a, 306b, and 306c may be the output from the image normalizer and merger 108 from FIG. 1. Thus, the fault-plane corridor predictions 306a, 306b, and 306c may be further analyzed by the statistical analyzer 110.

As shown, the fault-plane corridor predictions 306a, 306b, and 306c include progressively thicker lines. The thicker line of the fault-plane corridor prediction 306c may indicate that the exact location of the identified fault is uncertain, while the thinner line of the fault-plane corridor prediction 306a may indicate that the location of the identified fault is more certain. The location uncertainty of the fault-plane corridor prediction 306b may fall between the location uncertainties of the fault-plane corridor predictions 306a and 306c. For example, the identified faults are likely present within the fault-plane corridor predictions 306a, 306b, and 306c, but the exact location may be more unknown in the fault-plane corridor prediction 306c than in the fault-plane corridor predictions 306a and 306b, as indicated by the width of the fault-plane corridor predictions 306a, 306b, and 306c. The varying location uncertainties in the fault-plane corridor predictions 306a, 306b, and 306c may be the result of differences in the seismic images 104 that are normalized and co-rendered to generate the processed seismic image 304. For example, each of the seismic images 104 may include slightly different fault locations.

Figure 4:
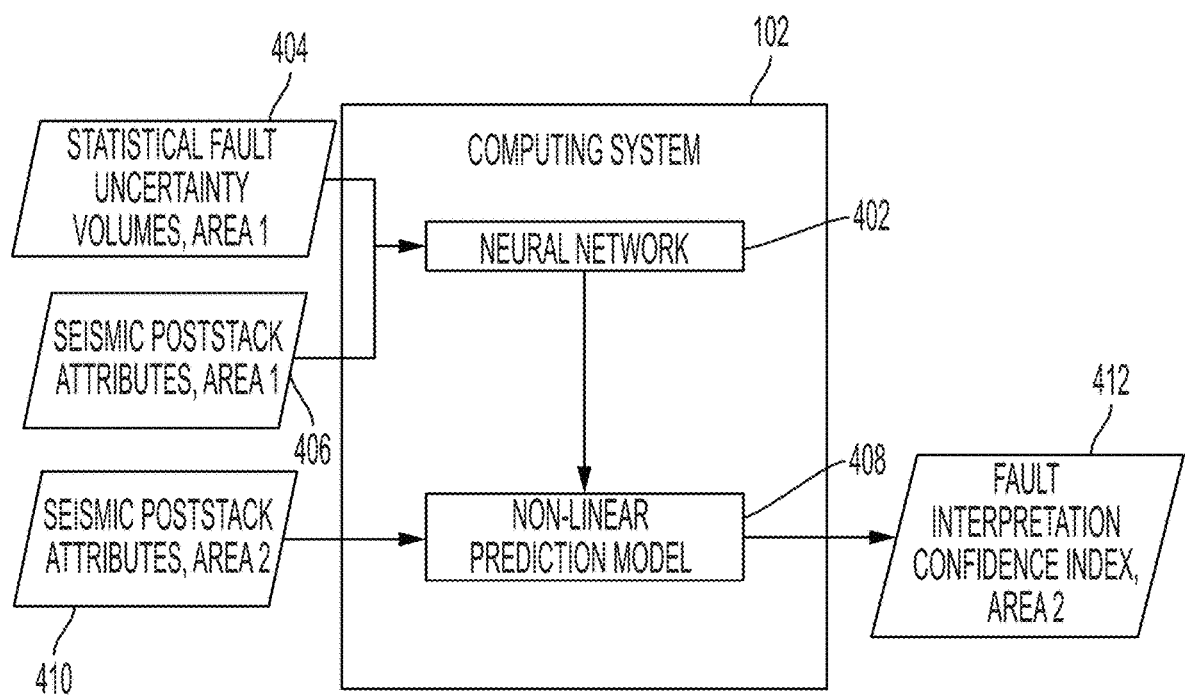
FIG. 4 depicts a computing environment including the computing system of FIG. 1 including a neural network according to some aspects of the present disclosure.

FIG. 4 is an example of a computing environment including the computing system 102 including a neural network 402 according to some aspects of the present disclosure. The neural network 402 may access the statistical fault uncertainty volumes 404 from a first geological area and a set of seismic poststack attributes 406 from the first geological area to train the neural network 402. The result of training the neural network 402 may be a non-linear prediction model 408.

In an example, the statistical fault uncertainty volumes 404 may be the same as the statistical fault uncertainty volumes 112 generated by the statistical analyzer 110, as discussed above with respect to FIG. 1. Further, the statistical fault uncertainty volumes 404 may be used as labels for the set of seismic poststack attributes 406 computed for the first geological area. The set of seismic poststack attributes 406 can include a shape index, instantaneous frequencies, or any other poststack attributes that are collected for the first geological area. In an example, the statistical fault uncertainty volumes 404 and the set of seismic poststack attributes 406 may be used in a supervised training operation of the neural network 402, such as a deep neural network (DNN). Other machine-learning architectures may also be used in place of the neural network 402. The supervised training operation may train the neural network 402 to generate the non-linear prediction model 408. Further, the non-linear prediction model 408 may be continually updated as new statistical fault uncertainty volumes are generated for different geological areas. The continual updates to the non-linear prediction model 408 may generate a more robust and accurate model for predicting fault interpretation confidence indexes in other geological areas.

Because the process of generating the statistical fault uncertainty volumes 404, as described above with respect to FIG. 1, may be computationally expensive, the non-linear prediction model 408 may be implemented to produce a fault interpretation confidence index of a second geological area that is different from the first geological area without generating a new statistical fault uncertainty volume. For example, the non-linear prediction model 408 may access a set of seismic poststack attributes 410 for the second geological area. Because the non-linear prediction model 408 was trained using the data generated for the first geological area, the non-linear prediction model 408 may use the set of seismic poststack attributes 410 to generate a fault interpretation confidence index 412 of the second geological area. The fault interpretation confidence index 412 may provide additional insight useful for fault interpretation for the second geological area where a statistical fault uncertainty volume has not been calculated. For example, the fault interpretation confidence index 412 may include an indication of uncertainty of a prediction of a fault being located at a particular location within the second geological area. Using the fault interpretation confidence index 412, a driller may be aware that a given fault prediction or interpretation includes a large uncertainty, such as in spatial location, and the driller is able to proceed carefully based on the awareness of the uncertainty.

Figure 5:
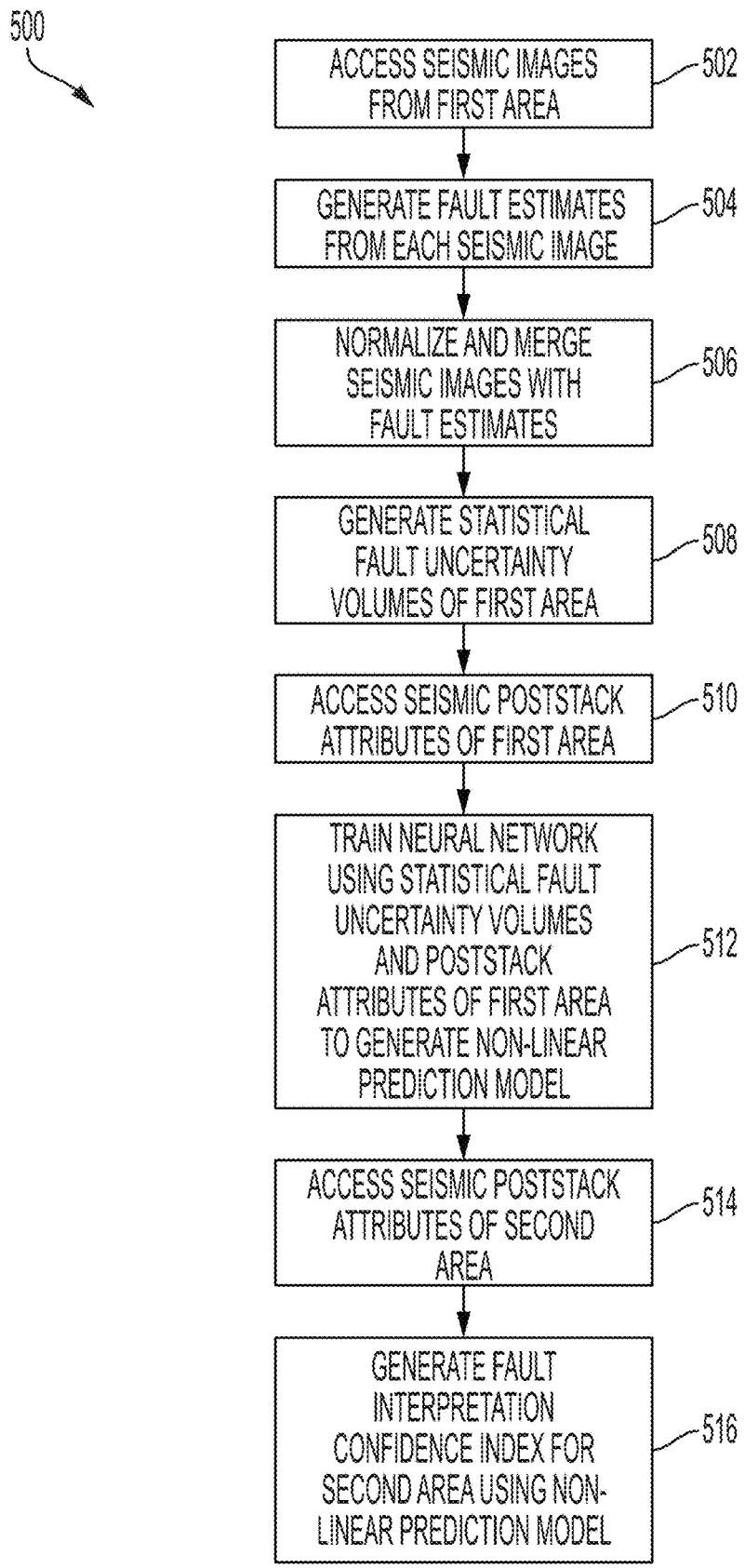
FIG. 5 depicts a flowchart of a process to generate a fault interpretation confidence index using a trained neural network according to some aspects of the present disclosure.

FIG. 5 is a flowchart of a process 500 for generating the fault interpretation confidence index 412 using the non-linear prediction model 408 according to some aspects of the present disclosure. At block 502, the process 500 involves accessing the seismic images 104 from a first geological area. Each of the seismic images 104 may represent different seismic surveys of the same geological area. For example, the seismic images 104 may include, but are not limited to, identical-domain subsurface images obtained by a range of seismic-wave migration algorithms using different migration velocity fields, images obtained from distinct frequency bandwidths of the seismic waves, and images obtained from partial stacks of seismic data. To achieve a statistically significant number of the seismic images 104, three or more different seismic images 104 may be accessed by the computing system 102 for further processing. More or fewer seismic images 104 may also be used to generate uncertainty results of varying qualities.

At block 504, the process 500 involves generating fault estimates from each of the seismic images 104. For example, the seismic image processor 106 may repeatedly process each of the seismic images 104 accessed by the computing system 102. The processing operations may estimate fault likelihoods at different locations depicted in the seismic images 104 using distinct hyper-parameter settings. Each algorithmic hyper-parameter setting can simulate various fault interpretation styles and goals by constraining, for example, fault stiffness and reflector truncation sharpness. In an example, each of the seismic images 104 may be processed multiple times with a focus on the different hyper-parameters to generate an estimate of fault likelihoods and locations in each of the seismic images 104.

At block 506, the process 500 involves normalizing and merging the seismic images 104 including the fault estimates. For example, the processed seismic images 104 may enter a quantitative analysis phase at the image normalizer and merger 108. The image normalizer and merger 108 may normalize and co-render all of the fault likelihood estimates generated for the seismic images 104 by the seismic image processor 106 at block 504.

Normalizing the fault likelihoods may be accomplished by generating a fault likelihood for each of the processed seismic images 104 at a normalized value between zero and one. Co-rendering the fault likelihood estimates may involve overlaying data sets of the processed seismic images 104 to generate a combined representation of the fault likelihood estimates of the set of processed seismic images 104.

At block 508, the process 500 involves generating statistical fault uncertainty volumes of the first geological area. For example, the output of the image normalizer and merger 108 may be accessed by the statistical analyzer 110 in a quantitative fault analysis phase of processing the seismic images 104. If data quality is sufficient, the normalized and merged fault likelihood volumes that are output by the image normalizer and merger 108 may be analyzed statistically. The resulting statistical fault uncertainty volumes 112 may be output by the statistical analyzer 110 of the computing system 102.

At block 510, the process 500 involves accessing seismic poststack attributes 406 of the first area. In an example, the neural network 402 may access the statistical fault uncertainty volumes 112 from a first geological area and the set of seismic poststack attributes 406 from the first geological area for use as training data when train the neural network 402.

At block 512, the process 500 involves training the neural network 402 to generate the non-linear prediction model 408. In an example, the statistical fault uncertainty volumes 404 and the set of seismic poststack attributes 406 may be used in a supervised training operation of the neural network 402, such as a deep neural network (DNN). The supervised training operation may train the neural network 402 to generate the non-linear prediction model 408. Further, the non-linear prediction model 408 may be continually updated as new statistical fault uncertainty volumes are generated for different geological areas. The continual updates to the non-linear prediction model 408 may generate a more robust and accurate model for predicting fault interpretation confidence indexes in other geological areas.

At block 514, the process 500 involves accessing the seismic poststack attributes 410 of a second geological area. Because the non-linear prediction model 408 was trained using the data generated for the first geological area, the non-linear prediction model 408 may use the set of seismic poststack attributes 410 to generate a fault interpretation confidence index 412 of the second geological area.

At block 516, the process 500 involves generating the fault interpretation confidence index 412 of the second geological area using the non-linear prediction model 408. The fault interpretation confidence index 412 may provide additional insight useful for fault interpretation for the second geological area where a statistical fault uncertainty volume has not been calculated.

Figure 6:
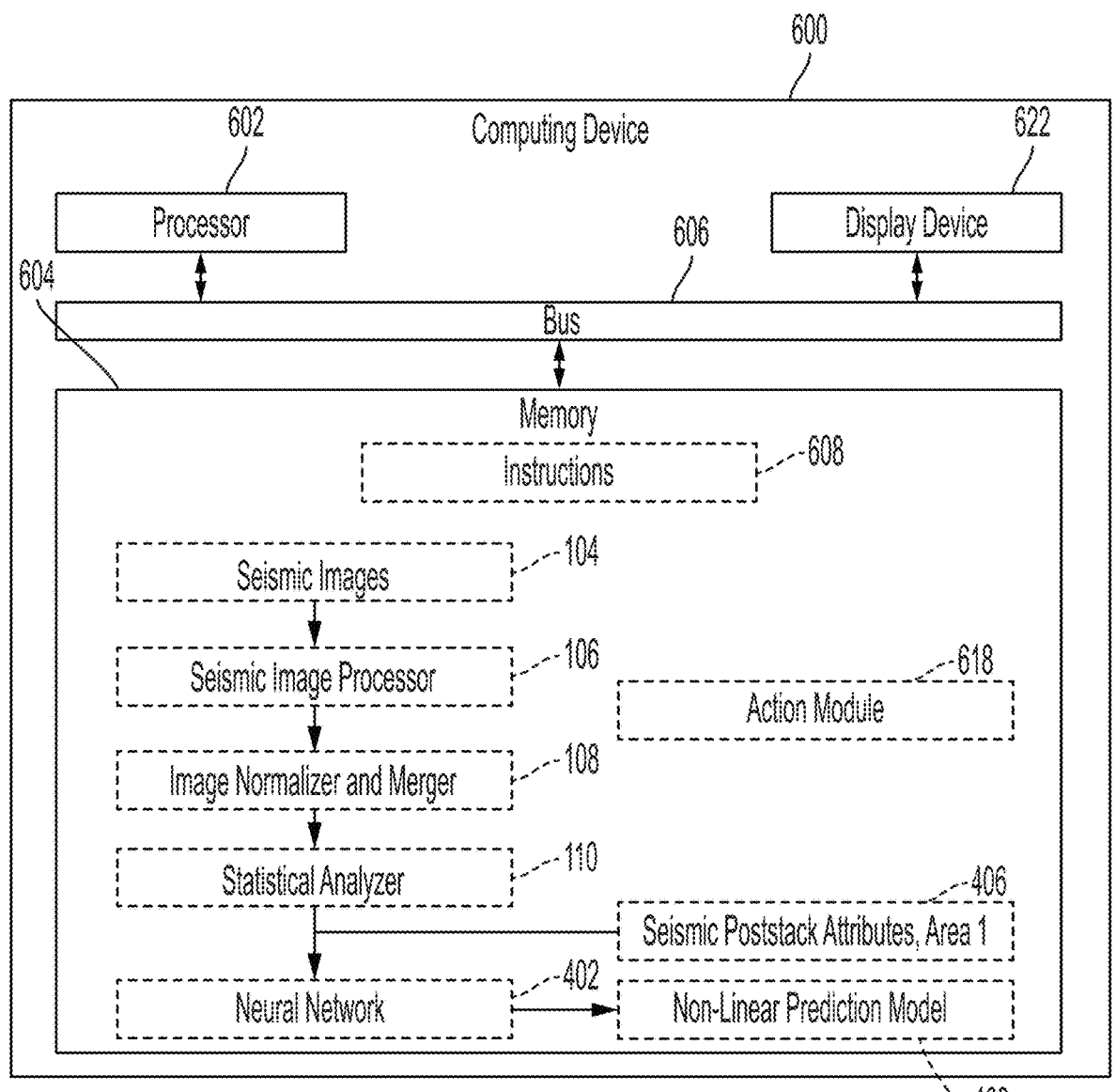
FIG. 6 is a block diagram of a computing device according to some aspects of the present disclosure.

FIG. 6 is a block diagram of an example of a computing device 600 according to some aspects of the present disclosure. While FIG. 6 depicts the computing device 600 as including certain components, other examples may involve more, fewer, or different components than are shown in FIG. 6. In an example, the computing device 600 may be implemented as the computing system 102, as described above with respect to FIG. 1.

As shown, the computing device 600 includes a processor 602 communicatively coupled to a memory 604 by a bus 606. The processor 602 can include one processor or multiple processors. Non-limiting examples of the processor 602 include a Field-Programmable Gate Array (FPGA), an application-specific integrated circuit (ASIC), a microprocessor, or any combination of these. The processor 602 can execute instructions 608 stored in the memory 604 to perform operations. In some examples, the instructions 608 can include processor-specific instructions generated by a compiler or an interpreter from code written in any suitable computer-programming language, such as C, C++, C #, or Java.

The memory 604 can include one memory device or multiple memory devices. The memory 604 can be non-volatile and may include any type of memory device that retains stored information when powered off. Non-limiting examples of the memory 604 include electrically erasable and programmable read-only memory (EEPROM), flash memory, or any other type of non-volatile memory. At least some of the memory device includes a non-transitory computer-readable medium from which the processor 602 can read instructions 608. A non-transitory computer-readable medium can include electronic, optical, magnetic, or other storage devices capable of providing the processor 602 with the instructions 608 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 608.

The computing device 600 may include or otherwise access the seismic images 104. The computing device 600 may also include the seismic image processor 106 that can receive the seismic images 104 for processing. The computing device 600 can execute the image normalizer and merger and the statistical analyzer 110 to generate the statistical fault uncertainty volumes 112. Further, the computing device 600 can include a neural network 402 that is trainable using seismic poststack attributes 406 of the area associated with the seismic images 104 and the statistical fault uncertainty volumes 112 that are output by the statistical analyzer 110. Once trained, the neural network 402 may be the non-linear prediction model 408, which is capable of generating fault interpretation confidence indexes 412 of additional areas. The fault interpretation confidence indexes 412 can provide useful information to an operator regarding predicted locations of faults.

The computing device 600 can also include an action module 618. The action module 618 can include executable program code for taking one or more actions based on the output of the non-linear prediction model 408. For example, the computing device 600 may execute the action module 618 to control a drilling operation within a subterranean formation. In such an example, a drilling direction may be determined based on a predicted location of a fault in the subterranean formation prior to drilling into the fault. The control of the drilling operation may also generally include making a determination about whether to drill a well based on economic risk implied by the volumetric uncertainty provided by the fault uncertainty confidence indexes 412. For example, the fault uncertainty confidence indexes 412 may provide information that accounts for economic risk of drilling a well in a particular area by estimating uncertainty in volumetrics and providing an indication of a quality of crucial fault seals. In another example, the computing device 600 can execute the action module 618 to determine whether an area is more suitable for hydrocarbon exploration than other similarly analyzed areas based on the fault interpretation confidence indexes 412. The computing device 600 can then generate a graphical user interface (GUI) indicating whether particular areas are suitable for further exploration and display the GUI on a display device 622, such as a liquid crystal display or light emitting diode display.

As one particular example, the computing device 600 uses the non-linear prediction model 408 to generate an output indicating the fault interpretation confidence indexes 412. The computing device 600 can then execute the action module 618 to apply a set of rules based on the output to determine whether particular areas are suitable for hydrocarbon exploration. The rules may indicate that the particular areas are predicted to have well defined fault locations or uncertain fault locations. The computing device 600 can generate and display a GUI that includes an alert indicating whether the particular areas are suitable for further exploration or should be avoided during a drilling operation.

Fault uncertainty analysis in hydrocarbon exploration can be facilitated according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory including instructions that are executable by the processor for causing the processor to: access a plurality of seismic images of a subterranean formation in a first geological area; generate a plurality of fault estimates from each of the plurality of seismic images; generate a processed seismic image of the first geological area by normalizing and merging the plurality of seismic images and the plurality of fault estimates; generate a statistical fault uncertainty volume of the first geological area using the processed seismic image; and control a drilling operation in the first geological area using the statistical fault uncertainty volume of the first geological area.

Example 2 is the system of example 1, wherein the instructions are further executable by the processor for causing the processor to: generate a prediction model by training a deep neural network using the statistical fault uncertainty volume of the first geological area and a first set of seismic attributes of the first geological area; and generate a confidence index of a fault location in a second geological area by applying the prediction model to a second set of seismic attributes of the second geological area.

Example 3 is the system of example 2, wherein the instructions are further executable by the processor for causing the processor to: control a drilling operation in the second geological area using the confidence index of the fault location in the second geological area.

Example 4 is the system of examples 1-3, wherein the plurality of seismic images comprise at least three different seismic images.

Example 5 is the system of example 4, wherein the plurality of seismic images are generated from a plurality of sub-angle ranges used to receive seismic wave reflections from the subterranean formation in the first geological area.

Example 6 is the system of examples 1-5, wherein controlling the drilling operation in the first geological area comprises controlling the drilling operation to avoid a portion of the first geological area where the statistical fault uncertainty volume indicates a high degree of uncertainty in a fault-presence prediction.

Example 7 is the system of examples 1-6, wherein controlling the drilling operation in the first geological area is performed prior to drilling into a fault in the first geological area.

Example 8 is the system of examples 1-7, wherein the statistical fault uncertainty volume comprises an indication of uncertainty that a particular pixel associated with a location in a subterranean formation is along a fault.

Example 9 is a method comprising: accessing, by a processor, a plurality of seismic images of a subterranean formation in a first geological area; generating, by the processor, a plurality of fault estimates from each of the plurality of seismic images; generating, by the processor, a processed seismic image of the first geological area by normalizing and merging the plurality of seismic images and the plurality of fault estimates; and generating, by the processor, a statistical fault uncertainty volume of the first geological area using the processed seismic image.

Example 10 is the method of example 9, further comprising: generating, by the processor, a prediction model by training a machine-learning architecture using the statistical fault uncertainty volume of the first geological area and a first set of seismic attributes of the first geological area; and generating, by the processor, a confidence index of a fault location in a second geological area by applying the prediction model to a second set of seismic attributes of the second geological area.

Example 11 is the method of example 10, further comprising: controlling, by the processor, a drilling operation in the second geological area using the confidence index of the fault location in the second geological area.

Example 12 is the method of examples 9-11, further comprising: controlling, by the processor, a drilling operation in the first geological area using the statistical fault uncertainty volume of the first geological area.

Example 13 is the method of example 12, wherein controlling the drilling operation in the first geological area is performed prior to drilling into a fault in the first geological area.

Example 14 is the method of examples 9-13, wherein the statistical fault uncertainty volume comprises an indication of uncertainty that a particular pixel associated with a location in a subterranean formation is along a fault.

Example 15 is the method of examples 9-14, wherein generating the plurality of fault estimates from each of the plurality of seismic images comprises: processing, by the processor, the plurality of seismic images using a plurality of algorithmic hyper-parameter settings on each of the plurality of seismic images to generate the plurality of fault estimates.

Example 16 is a non-transitory computer-readable medium comprising program code that is executable by a processor for causing the processor to: access a plurality of seismic images of a subterranean formation in a first geological area; generate a plurality of fault estimates from each of the plurality of seismic images; generate a processed seismic image of the first geological area by normalizing and merging the plurality of seismic images and the plurality of fault estimates; and generate a statistical fault uncertainty volume of the first geological area using the processed seismic image.

Example 17 is the non-transitory computer-readable medium of example 16, wherein the program code is further executable by the processor for causing the processor to: generate a prediction model by training a deep neural network using the statistical fault uncertainty volume of the first geological area and a first set of seismic attributes of the first geological area; and generate a confidence index of a fault location in a second geological area by applying the prediction model to a second set of seismic attributes of the second geological area.

Example 18 is the non-transitory computer-readable medium of example 17, wherein the program code is further executable by the processor for causing the processor to: control a drilling operation in the second geological area using the confidence index of the fault location in the second geological area.

Example 19 is the non-transitory computer-readable medium of examples 16-18, wherein the program code is further executable by the processor for causing the processor to: control a drilling operation in the first geological area using the statistical fault uncertainty volume of the first geological area.

Example 20 is the non-transitory computer-readable medium of examples 16-19, wherein the statistical fault uncertainty volume comprises an indication of uncertainty that a particular pixel associated with a location in a subterranean formation is along a fault.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions that are executable by the processor for causing the processor to:
   access a plurality of seismic images of a subterranean formation in a first geological area;
   generate a plurality of fault estimates from each of the plurality of seismic images;
   generate a processed seismic image of the first geological area by normalizing and merging the plurality of seismic images and the plurality of fault estimates;
   generate a statistical fault uncertainty volume of the first geological area using the processed seismic image; and
   control a drilling operation in the first geological area using the statistical fault uncertainty volume of the first geological area.

2. The system of claim 1, wherein the instructions are further executable by the processor for causing the processor to:
   generate a prediction model by training a deep neural network using the statistical fault uncertainty volume of the first geological area and a first set of seismic attributes of the first geological area; and
   generate a confidence index of a fault location in a second geological area by applying the prediction model to a second set of seismic attributes of the second geological area.

3. The system of claim 2, wherein the instructions are further executable by the processor for causing the processor to:
   control a drilling operation in the second geological area using the confidence index of the fault location in the second geological area.

4. The system of claim 1, wherein the plurality of seismic images comprise at least three different seismic images.

5. The system of claim 4, wherein the plurality of seismic images are generated from a plurality of sub-angle ranges used to receive seismic wave reflections from the subterranean formation in the first geological area.

6. The system of claim 1, wherein controlling the drilling operation in the first geological area comprises controlling the drilling operation to avoid a portion of the first geological area where the statistical fault uncertainty volume indicates a high degree of uncertainty in a fault-presence prediction.

7. The system of claim 1, wherein controlling the drilling operation in the first geological area is performed prior to drilling into a fault in the first geological area.

8. The system of claim 1, wherein the statistical fault uncertainty volume comprises an indication of uncertainty that a particular pixel associated with a location in a subterranean formation is along a fault.

9. A method comprising:
   accessing, by a processor, a plurality of seismic images of a subterranean formation in a first geological area;
   generating, by the processor, a plurality of fault estimates from each of the plurality of seismic images;
   generating, by the processor, a processed seismic image of the first geological area by normalizing and merging the plurality of seismic images and the plurality of fault estimates;
   generating, by the processor, a statistical fault uncertainty volume of the first geological area using the processed seismic image;
   generating, by the processor, a prediction model by training a machine-learning architecture using the statistical fault uncertainty volume of the first geological area and a first set of seismic attributes of the first geological area; and
   generating, by the processor, a confidence index of a fault location in a second geological area by applying the prediction model to a second set of seismic attributes of the second geological area.

10. The method of claim 9, further comprising:
    controlling, by the processor, a drilling operation in the second geological area using the confidence index of the fault location in the second geological area.

11. The method of claim 9, further comprising:
    controlling, by the processor, a drilling operation in the first geological area using the statistical fault uncertainty volume of the first geological area.

12. The method of claim 11, wherein controlling the drilling operation in the first geological area is performed prior to drilling into a fault in the first geological area.

13. The method of claim 9, wherein the statistical fault uncertainty volume comprises an indication of uncertainty that a particular pixel associated with a location in a subterranean formation is along a fault.

14. The method of claim 9, wherein generating the plurality of fault estimates from each of the plurality of seismic images comprises:
    processing, by the processor, the plurality of seismic images using a plurality of algorithmic hyper-parameter settings on each of the plurality of seismic images to generate the plurality of fault estimates.

15. A non-transitory computer-readable medium comprising program code that is executable by a processor for causing the processor to:
    access a plurality of seismic images of a subterranean formation in a first geological area;
    generate a plurality of fault estimates from each of the plurality of seismic images;
    generate a processed seismic image of the first geological area by normalizing and merging the plurality of seismic images and the plurality of fault estimates;
    generate a statistical fault uncertainty volume of the first geological area using the processed seismic image;
    generate a prediction model by training a deep neural network using the statistical fault uncertainty volume of the first geological area and a first set of seismic attributes of the first geological area; and
    generate a confidence index of a fault location in a second geological area by applying the prediction model to a second set of seismic attributes of the second geological area.

16. The non-transitory computer-readable medium of claim 15, wherein the program code is further executable by the processor for causing the processor to:
    control a drilling operation in the second geological area using the confidence index of the fault location in the second geological area.

17. The non-transitory computer-readable medium of claim 15, wherein the program code is further executable by the processor for causing the processor to:

control a drilling operation in the first geological area using the statistical fault uncertainty volume of the first geological area.

18. The non-transitory computer-readable medium of claim 15, wherein the statistical fault uncertainty volume comprises an indication of uncertainty that a particular pixel associated with a location in a subterranean formation is along a fault.

\* \* \* \* \*